US008646413B2

(12) United States Patent
Padia

(10) Patent No.: US 8,646,413 B2
(45) Date of Patent: Feb. 11, 2014

(54) NON-SKID DOUBLE-LAYER PET BOWL AND A METHOD OF FABRICATING THE SAME

(76) Inventor: Ashish Padia, New Delhi (IN)

( * ) Notice: Subject to any disclaimer, the term of this patent is extended or adjusted under 35 U.S.C. 154(b) by 98 days.

(21) Appl. No.: 13/216,725

(22) Filed: Aug. 24, 2011

(65) Prior Publication Data

US 2012/0285388 A1 Nov. 15, 2012

(30) Foreign Application Priority Data

May 11, 2011 (IN) .............................. 1378/DEL/2011

(51) Int. Cl.
*A01K 5/00* (2006.01)

(52) U.S. Cl.
USPC ....................................... 119/61.5; 119/61.56

(58) Field of Classification Search
USPC .................. 119/61.5, 61.56, 61.54, 51.5, 72; D30/129; 220/574, 574.3, 636, 626, 220/575, 635, 646, 665
See application file for complete search history.

(56) References Cited

U.S. PATENT DOCUMENTS

| | | | | |
|---|---|---|---|---|
| 517,789 | A * | 4/1894 | Buckley | 215/386 |
| 1,959,262 | A * | 5/1934 | Colabrese | 220/632 |
| 1,985,558 | A * | 12/1934 | Alexander | 220/632 |
| 2,526,165 | A * | 10/1950 | Smith | 62/457.3 |
| 2,731,056 | A * | 1/1956 | Anson | 16/86 A |
| 3,698,594 | A * | 10/1972 | Boehlert | 220/495.01 |
| 4,803,954 | A * | 2/1989 | Welch et al. | 119/61.53 |
| 4,828,112 | A * | 5/1989 | Vollrath et al. | 206/519 |
| 5,000,123 | A * | 3/1991 | Morse et al. | 119/61.54 |
| 5,018,695 | A * | 5/1991 | Bishop | 248/346.11 |
| 5,413,302 | A * | 5/1995 | Ferster | 248/346.11 |
| 5,485,937 | A * | 1/1996 | Tseng | 220/571 |
| 5,579,946 | A * | 12/1996 | Rowan et al. | 220/592.27 |
| 5,842,675 | A * | 12/1998 | Davitt | 248/346.5 |
| 5,957,038 | A * | 9/1999 | Shimazaki | 99/340 |
| 5,979,361 | A * | 11/1999 | Willinger | 119/61.54 |
| 5,992,671 | A * | 11/1999 | Wardani | 220/293 |
| D423,733 | S * | 4/2000 | Choi et al. | D30/129 |
| 6,092,689 | A * | 7/2000 | Bennett | 220/729 |
| 6,330,956 | B1 * | 12/2001 | Willinger | 220/574 |
| 6,431,389 | B1 * | 8/2002 | Jerstroem et al. | 220/574.3 |
| 6,516,747 | B1 * | 2/2003 | Willinger | 119/61.54 |
| 6,578,809 | B1 * | 6/2003 | Dimella | 248/346.11 |
| 6,672,248 | B2 * | 1/2004 | Bourigault | 119/63 |
| 7,216,413 | B2 * | 5/2007 | Cheng et al. | 29/505 |
| D564,711 | S * | 3/2008 | Modi et al. | D30/129 |
| D565,253 | S * | 3/2008 | Modi et al. | D30/129 |
| 7,527,018 | B2 * | 5/2009 | Manley-Hood | 119/61.5 |
| D613,125 | S * | 4/2010 | Sierra et al. | D7/584 |
| D613,556 | S * | 4/2010 | Sierra et al. | D7/584 |
| 8,286,589 | B1 * | 10/2012 | Tsengas | 119/61.56 |

\* cited by examiner

*Primary Examiner* — Yvonne Abbott
(74) *Attorney, Agent, or Firm* — SoCal IP Law Group LLP

(57) ABSTRACT

The present invention provides a non-skid double-layer pet bowl for feeding animals and also provides a method of fabricating the said bowl. The bowl has an anti-skid bottom, so that the bowl does not move when the animal is eating or drinking from it. Another feature of the bowl is that materials, plastic and metal can be detached from each other. The plastic bowl is on the outside and is printed with various prints to make it attractive. Only this outer plastic bowl can be changed by removing it, in case of any damage or to obtain a different pattern.
When detached, both the bowls can be used separately also, as double diner, that is one for feeding and the other one for drinking water for animal.
The present invention also provides a method of fabricating the non-skid pet bowl. The bowls of the present invention are easy to fabricate, attractive in appearance and cost-effective.

11 Claims, 1 Drawing Sheet

NON-SKID DOUBLE-LAYER PET BOWL AND A METHOD OF FABRICATING THE SAME

The present application claims priority to 1378/DEL/2011 filed in India on May 11, 2011.

FIELD OF THE INVENTION

The present invention provides a non-skid double-layer pet bowl for feeding animals and also provides a method of fabricating the said bowl.

More particularly, the invention relates to the bowls made up of plastic and a metal, preferably stainless steel. Both the materials used are being fused to each other.

The bowl has an anti-skid bottom, so that the bowl does not move when the animal is eating or drinking from it. Another feature of the bowl is that materials, plastic and metal can be detached from each other. The plastic bowl is on the outside and is printed with various prints to make it attractive. Only this outer plastic bowl can be changed by removing it, in case of any damage or to obtain a different pattern.

When detached, both these bowls can be used separately also, as double diner, that is one for feeding and the other one for drinking water for animal.

BACKGROUND OF THE INVENTION

There are some commonly used pet bowls in the prior art. One of such types is molded plastic bowl. The molded plastic bowls have some of its advantages like cheap manufacturing; colorful appearance; non-breakable and easy to clean and maintain. But plastic bowls have one major disadvantage, which is that they are very light in weight. Due to this, they are easily moved by normal activity of pets. It can be displaced or toppled by pet accidentally or while consuming food or water. This results in a mess and wastage of food as well.

There are various known plastic pet bowls where different means have been applied to overcome the above-discussed drawbacks. One such method is to mold a plastic bowl with thicker and heavier walls so as to make the bowl bit more difficult to displace by pet during its use. Another method involved is molding the bowl with inner and/or outer walls so as to increase its weight. However, such methods do not provide completely non-displaceable pet bowls and at the same time, increase the cost of plastic bowls significantly.

Regarding some of the pet bowls known in prior-art; reference may be made to the following patents:

Reference may be made to US 2008/0216754 A1, which relates to the field of animal feeders, and particularly relates to raised dog-food bowls for taller dogs, having a food storage compartment. This invention relates to an animal feeder, which includes a storage region having a bottom wall, and sidewalls extending upwards from the bottom wall. The animal feeder further comprises a cover with at least one depression in the cover to receive a feeding bowl. The feeding bowl is isolated from the storage region when it is seated in the depression. The main advantage of this bowl is that it's useful for taller dogs. Many digestive problems in dogs are caused by taller dogs having to bend their head down to eat or drink. A raised bowl provides an ergonomically correct eating position for taller dogs. This elevated feeding position also alleviates pain for dogs suffering from arthritis.

Reference may be made to US 2009/0145371 A1, which relates to the art of animal restraints and particularly to such restraints, which are portable with a tangle-free tether that can be used outdoors and which also, provides a feeding and watering bowl that cannot be easily overturned. The device is portable and inexpensive device for restraining a dog, cat or other animal within a defined area. The device has a main body providing an endless circular groove that confines a wire or ring to rotating movement about the main body. The ring is attached to the animal's leash and allows the animal free movement within a circular area defined by the length of the leash. A number of removable pins anchor the device to the ground. The pins are being stored in storage grooves in the main body when not in use. The main body has a central recess that accommodates a bowl for food or water.

Reference may be made to U.S. Pat. No. 7,341,019, which provides a dog-feeding table having an elevated dog-feeding table, which incorporates an increased aesthetic appearance. A plastic molded base is provided with a choice of finish to match kitchen decor. Further, the base incorporating a raised ridge around its circumference with a raised lip around the bowl openings to prevent water or food from falling is provided. Legs can be added by force-fit, into receptacles, molded into the base and a wooden shelf can rest on top of the base to hold the feeding bowls.

Further Reference may be made to PCT/SG2007/000335, which relates to a bowl for containing food or drinking water for an animal, and particularly but not exclusively, for a pet dog. There is provided a bowl for containing food for an animal, the bowl comprising an interior volume for accommodating said food, the interior volume being defined by a base and an upwardly extending circumferential sidewall, wherein at least one protruding portion extends upwardly from the base of the bowl into the interior volume to obstruct the animal from consuming food too fast. There is provided a bowl for containing drinking water for an animal, the bowl comprising: (a) an interior volume for accommodating said water, the interior volume is defined by a base and an upwardly extending circumferential sidewall; and (b) a floating device for floating on said water, wherein the floating device has a conduit for allowing said water to form a reservoir of water on a drinking surface of the floating device for the animal to consume the water. The bowl is sized to hold the quantity of food, the quantity being consumed in a single feeding. The food can be dry or wet pet food.

Further Reference may be made to PCT/US2007/087189, which relates to a pet food bowl provided with an integral protrusion that helps to prevent inadvertent aspiration of food by the animal. Particularly for dogs, some feeding behaviors are characterized by swallowing large amounts of food. The protrusion in the bowl separates the food into a peripheral channel within the bowl, and the dog therefore cannot simultaneously secure large amounts of food into its mouth. The protrusion is centrally oriented and extends from the base of the bowl, thereby causing the food to be uniformly distributed within the channel. The channel or recess is preferably sized such that the animal's mouth can fit within the channel or recess, but since the food is distributed in the channel, the animal is prevented from simultaneously gathering a large amount of food in the mouth. The central protrusion has a curved or rounded configuration such that food is directed by gravity into the peripheral channel or recess. The central protrusion also serves as an obstacle to prevent the animal's mouth from accessing the entire channel of the bowl without movement of the animal.

Reference may also be made to U.S. Pat. No. 5,975,016 A, which provides a bowl for feeding a dog that avoids spillage of the food contents and as the dog licks the inside of the bowl in pursuit of the last morsels of the meal. The bowl is having a lip that is contoured a short distance toward the interior of the bowl so that food that is pushed by the animal's tongue to the lip and is trapped between the tongue and lip enabling the dog to eat all of its food with least inconvenience. There is also provided an apron extending from the lip of the ground so that an edge of the apron digs into the ground and prevents skidding of the bowl on the ground. The bowl with these features is economically manufactured with a simple mold.

Further reference may be made to JP2007159421 (A), which is about providing a dinner bowl for pets (dogs) capable of holding forth to the mouth tip of a dog while holding it with the other hand without requiring labor even in a state supporting a dog with either one hand. The dinner bowl for pets (dogs) is composed of a dinner bowl body curved in recessed state and a nearly reversed L-shaped grip provided in the dinner bowl body, and the dinner bowl is hung through the grip from the hand and outer surface of the dinner bowl body is supported by the palm. As a result, the dinner bowl is held forth to the mouth tip of dog while holding it with the other hand without requiring labor even in a state supporting the dog with either one hand.

Further reference may be made to DE202006007215, which provides Retaining bowl for receiving animal e.g. dog, food serving cup, has retaining claws over edge of cup, where bowl is made up of rubber-like material with high adhesion and is used or removed only in perpendicular direction. The bowl has gripping units and two firm or resilient retaining claws over an edge of an animal food-serving cup. The bowl is partially made up of a rubber-like material with high adhesion and is used or removed only in a perpendicular direction. The cup is partially enclosed by the bowl in a form-fit manner, where diameter of a base of the bowl is about 25 centimeters.

Reference may be made to WO/1993/022906, which is about DOG WATERING BOWL. The watering bowl is having a platform, a reservoir, outlet means and fluid inlet means. The inlet means may be attached to a pressurized water supply. Water passes via tube to valve means, consisting of a frusto-conical cylinder and a piston. The piston is urged up into closed position by spring means. When pressure is applied to the platform, the piston moves down cylinder thereby creating a space through which water may pass through outlet into reservoir. A method of providing water to a dog is also described.

Reference may be made to 20090283047, which provides a Pet bowl with lid. A contiguous pet bowl and lid comprising a watertight hollow utensil connected to a lid by a tether. An adjacent skirt portion with means to secure a watertight seal around the rim surrounds the pet bowl. The topside aperture is large enough to accommodate use by an animal. The lid is seal-able when joined to the means to secure a watertight seal retaining liquid or solid matter in any position. The lid and pet bowl are also independent from a contiguous means. Other embodiments are described and shown.

Reference may be made to 1020050032982A, which relates to a dog Bowl For Preventing Ants From Approaching Dog Feed Bowl by use of water. The dog bowl for preventing ants is provided to prevent ants from approaching the dog feed bowl by use of water that the ants hate. The dog bowl for preventing ants includes a dog feed bowl, and an ant preventing bowl capable of being attached to and detached from the dog feed bowl by use of a magnet. The dog feed bowl has a frame protruded outside to prevent fragments of dog feed from falling into water put in the ant-preventing bowl when a dog eats feed from the dog feed bowl. Water is put between the dog-feed bowl and the ant-preventing bowl to prevent ants from approaching the dog feed bowl. A protruding portion is formed on the bottom of the dog-feed bowl to avoid the tilting of the dog-feed bowl.

Reference may be made to 1020010111414 A, which is an apparatus For Providing Feeds With Pet Dogs. The apparatus for providing feeds with pet dogs is provided, thereby regularly providing feeds with a pet dog according to pre-determined time, cleaning a bowl separately and regulating the quantity of feeds and water according to the size of pet dog. The apparatus for providing feeds with pet dogs comprises: (a) a feed bowl; (b) a base on which water bowl is placed; (c) supporters for a feeds bag and a water bag installed on the base in one body; (d) an extrusion apparatus of feeds, inherent in the feeds bag for controlling the extrusion of feeds filled in the feeds bag; (e) a switch inherent in the water bag for opening and shutting an outlet of the water bag; and (f) a controlling system for controlling the operation of the extrusion apparatus of feeds and the switch.

Reference may be made to U.S. Pat. No. 6,516,747, which provides a Non-skid pet bowl. The pet bowl is provided with a non-skid material attached to an outer wall and having improved frictional and drag properties. The non-skid material is molded over a portion of the bottom of the bowl. The non-skid material has components that extend downwardly along the outer wall and outwardly from the outer wall to contact a ground surface, with a gap defined along a contact surface between the downwardly extending and outwardly extending components of the material. The outwardly extending component of the non-skid material is preferably longer than the downwardly extending component for increased drag capabilities and to further inhibit movement of said pet bowl along a ground surface.

Reference may be made to U.S. Pat. No. 5,979,361, which relates to a Non-skid pet bowl. The non-skid pet bowl including a bowl having an undersurface. A layer of thermoplastic elastomer is disposed over the undersurface of the bowl, which provides the bowl with a non-skid lower surface. The non-skid pet bowl may be formed by a molding process that includes molding the bowl from a first material. Further, molding the layer of thermoplastic elastomer over the undersurface of the bowl, which provides a stronger bond between the bowl and the layer of thermoplastic elastomer.

Reference may be made to 3184/DEL/2005 A, which provides a SPILL PROOF PET BOWL. The Pet feeding Utensil with centrally cut upper lid with new locking system of lid and the utensil, wherein the lid is fastened on the upper portion of outer side wall of the pet feeding utensil, surface of the outer wall of the utensil by forming a raised ridge around the upper portion of pet feeding utensil, and raised ridge around the inside corner edge of the side walls of the lid, forming an interlocking device when pressed against each other from opposite directions;

Reference may be made to 1591/DEL/2006 A, which relates to a THERMAL AND DENT RESISTANT BOWL. The thermal and dent resistant bowl is used for keeping solid, liquid and feeding, is made of two layers, the inner layer of which is made up of stainless steel where as the outer layer is made up of plastic/polypropylene, in which the inner metal layer is fixed permanently with a plastic layer by molding the edges, making it temperature proof, dent proof None of the above-discussed patents provide a stainless steel bowl, which is non-skid in nature, easy to manufacture, cost-effective, and is having an appearance to attract pets. There is a need, therefore, for a pet bowl having improved non-skid properties that is not displaced or toppled by normal pet activity, has an appearance which attracts pets, is easy to manufacture and is cost-effective as well. The present invention overcomes all of the above-discussed drawbacks in prior art.

OBJECTS OF THE INVENTION

The main objective of the present invention is to provide a non-skid bowl for pets.

Another objective of the present invention is to provide a pet bowl having a non-skid material attached to the bottom of the bowl.

Another objective of the invention is to provide a pet bowl, which is double layer, with both layers being fused together.

Another objective of the invention is to provide a pet bowl, in which both layers can be detached and used as separate bowls, if required.

Another objective of the invention is to provide a pet bowl, which is useful for providing both food and water to the animal.

Another objective of the present invention is to provide a pet bowl, which does not move by the normal activity of the pet.

Another objective of the invention is to provide a pet bowl in which the non-skid material attached at the bottom of the bowl is present in the form of a ring.

Another objective of the invention is to provide a pet bowl in which the outer layer of bowl is covered with various animal patterns to attract the animals.

Still other objects and advantages of the invention will become clear upon review of the following detailed description in conjunction with the appended drawing.

SUMMARY OF THE INVENTION

The present invention provides a bowl for feeding pets, which is double-layer and non-skid in nature. The bowl may be used for feeding animal feed or water to pets. The bowl is not easily displaced or moved by the normal activity of the pet. A non-skid material is attached to the bottom of the bowl, said material is having improved frictional and drag properties. The non-skid material attached at the bottom of bowl in the form of a ring. Both layers of the bowl can be detached from each other and used as two separate bowls, if required.

The bowls are being printed with various animal patterns to attract animals.

STATEMENT OF THE INVENTION

Accordingly, the present invention provides a non-skid double-layer pet bowl for feeding animals, said bowl having an outer wall, an inner wall and a bottom; the bottom of said bowl covered partially by a non-skid material and the outer wall of said bowl being printed with various animal patterns as per requirement to attract animals, wherein the two layers of said bowl are made up of different materials fused together.

The present invention also provides a method of fabricating a non-skid double-layer pet bowl, said method comprising the steps of:
rolling bars of material used for manufacturing bowls into sheets; cutting the circles of required size out of the sheets obtained in step (a);
shaping the circles as obtained in step (b) in the double action pressing machine to make the bowls;
cutting and rolling the edges/flanges of the bowl obtained in step (c);
fabricating plastic bowls on an injection molding machine;
optionally printing the plastic bowls on a single color pad printing machine;
optionally polishing and buffing the stainless steel bowls of step (d); placing the stainless steel bowl inside the plastic bowl manually by pushing it within the groove on the top lip of plastic bowl to hold the stainless steel bowl within it;
Fixing the non-skid material at the bottom of the plastic bowls to obtain the final non-skid bowl.

Figure 1:
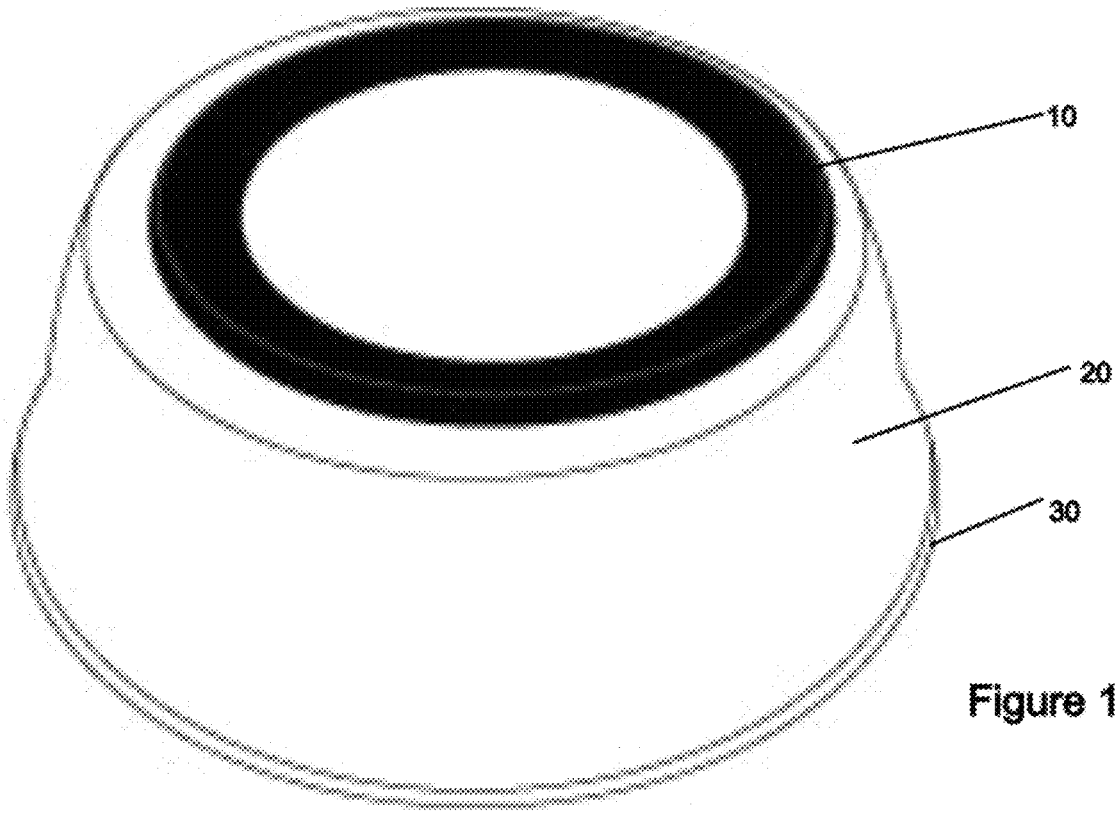
FIG. 1 is a bottom view of the bowl of embodiments of the disclosed technology.

DETAILED DESCRIPTION OF THE INVENTION:

Pet bowls made up of plastic are well known in literature. These molded plastic bowls have some of its advantages like cheap manufacturing, colorful appearance, non-breakable and easy to clean and maintain. But plastic bowls have one major disadvantage, which is they are very light in weight. Due to this, they are easily moved by normal activity of pets. It can be displaced or toppled by pet accidentally or while consuming food or water. This results in a mess and wastage of food as well. There are various known plastic pet bowls where different means have been applied to overcome the above-discussed drawbacks. One such method is to mold a plastic bowl with thicker and heavier walls so as to make the bowl bit more difficult to displace by pet during its use. Another method involved molding the bowl with inner and/or outer walls so as to increase its weight. However, such methods do not provide completely non-displaceable pet bowls and at the same time, increase the cost of plastic bowls significantly.

To overcome the drawbacks of the prior art, the present invention provides the food and liquid bowls or dishes for household pets. The bowl is useful for storing water as well as solid food for pets. The pet bowl of present invention is made up of stainless steel and has improved non-skid properties, which prevent the bowl from skidding or toppling over by normal movement of pet or animal.

The bowls of present invention are made up of stainless steel. For storage of solid and liquid foods, stainless steel is considered better than plastic. Plastic contains certain chemical additives some of which may leach out and cause health problems to animals. According to a number of studies, heat further increases the release of these harmful additives into the food. If there are any scratches on plastic due to prolonged use, this also increases the prospectus of leaching.

Most of the plastics are made from crude oil. But there are certain plastics, which are food-grade, are made up of starches and are biodegradable. But there are still concerns with these plastics regarding the use of fertilizers and pesticides used in the production of these plastics.

Stainless steel is cost-effective, easy to use, durable and easy to clean. Stainless steel is much more resistant to heat or cold and even resistant to impact related damages. Stainless steel can withstand very hot and very cold temperatures. This makes the material ideal for pet bowls. Unlike plastic, stainless steel does not break easily, even if dropped. Cleaning stainless steel bowls is very easy.

Stainless steel is resistant to corrosion. It has good aesthetic appearance. The bowls made of stainless steel are easy to fabricate. When the entire life-cycle costs are considered, stainless steel is the most cost effective material. Stainless steel bowls lasts a long time, which saves money in the long run.

The present invention provides a non-skid double-layer pet bowl for feeding animals and also provides a method of fabricating the said bowl.

More particularly, the invention relates to the bowls made up of plastic and a metal, preferably stainless steel. Both the materials used are being fused to each other.

Figure 2:
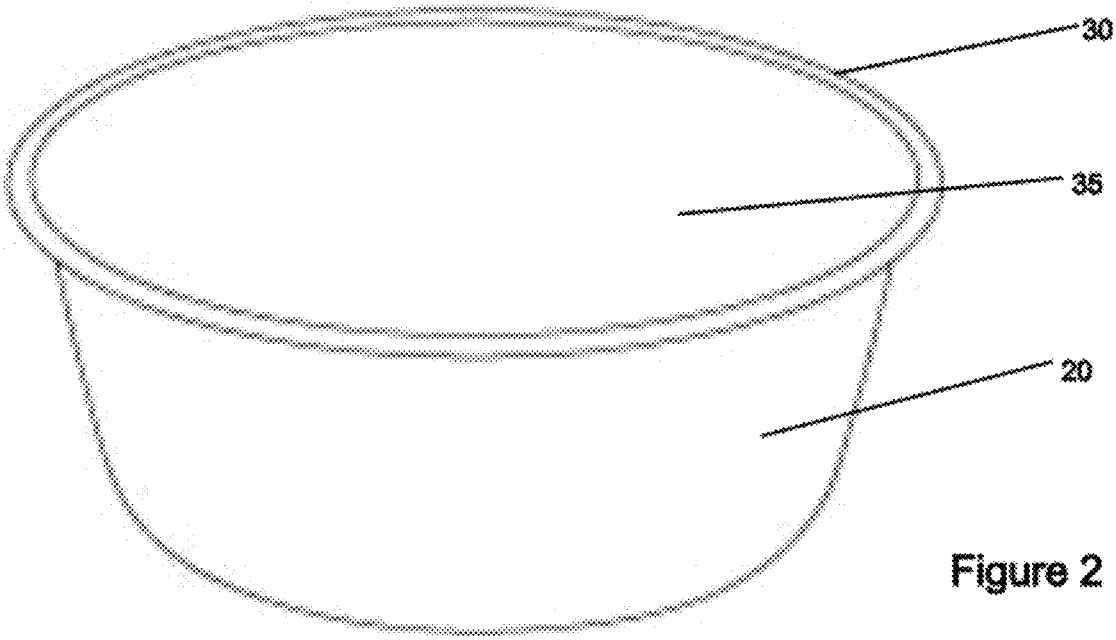
FIG. 2 is a top view of the bowl of embodiments of the disclosed technology.

Referring to the Figures, FIG. 1 is a bottom view of the bowl of embodiments of the disclosed technology. FIG. 2 is a top view of the bowl of embodiments of the disclosed technology. The bowl has an anti-skid bottom 10, so that the bowl does not move when the animal is eating or drinking from it. Another feature of the bowl is that materials, plastic and metal can be detached from each other. The plastic bowl is on the outside 20 and is printed with various prints to make it attractive. Only this outer plastic bowl can be changed by removing it, in case of any damage or to obtain a different pattern.

When detached, both the bowls can be used separately also, as double diner, that is one for feeding and the other one for drinking water for animal.

The metal or stainless steel bowl is produced after cutting the circles from the sheet, then giving shape of the bowl by drawing the bowl on a double Action press machine. The plastic bowl is made on an injection molding machine. The plastic bowl is printed on a single color pad printing machine. Then the stainless steel bowl is placed inside 35 the plastic bowl with just the hand pressure, and the groove on the top lip 30 of plastic bowl 20 will hold the stainless steel bowl 35 within it. The rubber 10 is fixed in the bottom groove of the plastic bowl to make the bowl non tip. The plastic bowl is made of PP i.e. poly propylene. The stainless steel bowl is made of 100% non magnetic and rust proof stainless steel of 14/1 Grade. The non-tip rubber ring is made of rubber.

Accordingly, the present invention provides a non-skid double-layer pet bowl for feeding animals, said bowl having an outer wall, an inner wall and a bottom; the bottom of said bowl covered partially by a non-skid material and the outer wall of said bowl being printed with various animal patterns as per requirement to attract animals, wherein the two layers of said bowl are made up of different materials fused together.

In a preferred embodiment, the two materials used for fabricating bowl are preferably stainless steel and plastic.

In another embodiment, stainless steel layer preferably forms the inside layer.

In yet another embodiment, plastic layer preferably covers the stainless steel layer from outside.

In a further embodiment, both the layers of materials are fused together.

In another embodiment, both the layers can be used separately as well after detaching.

In yet another embodiment, only the outer layer can be replaced when required.

In another embodiment, the plastic used for fabricating bowls is preferably polypropylene.

In a further embodiment, said non-skid material is preferably rubber.

In another embodiment, said non-skid material is synthetic rubber or silicone rubber.

In yet another embodiment, outer walls of said bowl are printed with different animal patterns to attract animals.

In another embodiment, said non-skid material at the bottom of the bowl surface is in the form of a ring.

In another embodiment, the present invention provides a method of fabricating a non-skid double-layer pet bowl, said method comprising the steps of:

rolling bars of material used for manufacturing bowls into sheets;
cutting the circles of required size out of the sheets obtained in step (a);
shaping the circles as obtained in step (b) in the double action pressing machine to make the bowls;
cutting and rolling the edges/flanges of the bowl obtained in step (c);
fabricating plastic bowls on an injection molding machine;
optionally printing the plastic bowls on a single color pad printing machine;
optionally polishing and buffing the stainless steel bowls of step (d);
placing the stainless steel bowl inside the plastic bowl manually by pushing it within the groove on the top lip of plastic bowl to hold the stainless steel bowl within it;
Fixing the non-skid material at the bottom of the plastic bowls to obtain the final non-skid bowl.

In yet another embodiment, said non-skid material is applied at the bottom of bowl preferably by fixing the rubber inside the group well-known in the art.

In a further embodiment, the non-skid pet bowl is used for providing food as well as water to animals.

The devices and machinery used to manufacture/fabricate the bowls of present invention are well-known in the prior art.

The above description and this specification describe only the most preferred embodiments of the invention. It is important to note that various other alternatives and variations of the invention (both product and method) are possible and are within the scope of this invention only. The embodiments described above thus should not be construed to limit the scope of the invention.

ADVANTAGES OF THE INVENTION

The bowls of present invention are made up of stainless steel and not of plastic bowls known in nature.

The bowls of present invention have non-skid material at the bottom, which prevents the bowl from displacement or toppling over by normal activity of the pet.

The bowls of present invention are cost-effective, easy to fabricate and have a long life.

The bowls can be detached and used separately.

In case of damage, only the layer which requires replacement can be replaced, rather than the entire bowl.

The bowls are manufactured using a simple and effective method, thus avoiding the use of any complex machinery and steps, thus further reducing the cost of manufacturing.

The bowls do not involve any chemicals harmful to the animals.

I claim:

1. A non-skid double-layer pet bowl for feeding animals, said bowl having an outer layer, an inside layer and a bottom; the bottom of said bowl covered partially by a non-skid material wherein the two layers of said bowl are made up of different materials fused together by way of the inside layer manually placed and held within the outer layer.

2. The non-skid double-layer pet bowl as claimed in claim 1, wherein the two materials used for fabricating the bowl are preferably stainless steel and plastic.

3. The non-skid double-layer pet bowl as claimed in claim 2, wherein the plastic used for fabricating the bowl is preferably polypropylene.

4. The non-skid double-layer pet bowl as claimed in claim 1, wherein a stainless steel layer preferably forms the inside layer.

5. The non-skid double-layer pet bowl as claimed in claim 4, wherein plastic layer preferably covers the stainless steel layer from outside.

6. The non-skid double-layer pet bowl as claimed in claim 1, wherein both the layers can be used separately as well after detaching.

7. The non-skid double-layer pet bowl as claimed in claim 1, wherein only the outer layer can be replaced when required.

8. The non-skid double-layer pet bowl as claimed in claim 1, wherein said non-skid material is preferably rubber.

9. The non-skid double-layer pet bowl as claimed in claim 1, wherein said non-skid material is synthetic rubber or silicone rubber.

10. The non-skid double-layer pet bowl as claimed in claim 1, wherein an outer wall of the outer layer of said bowl is printed with different animal patterns to attract animals.

11. The non-skid double-layer pet bowl as claimed in claim 1, wherein said non-skid material at the bottom of the bowl surface is in the form of a ring.

\* \* \* \* \*